United States Patent
Fleming

(10) Patent No.: US 10,913,010 B2
(45) Date of Patent: Feb. 9, 2021

(54) METHODS OF DISTILLATION

(71) Applicant: THE QUEENSTOWN TRUST, Auckland (NZ)

(72) Inventor: John Fleming, Auckland (NZ)

(73) Assignee: THE QUEENSTOWN TRUST, Auckland (NZ)

(*) Notice: Subject to any disclaimer, the term of this patent is extended or adjusted under 35 U.S.C. 154(b) by 29 days.

(21) Appl. No.: 16/476,932

(22) PCT Filed: Dec. 27, 2017

(86) PCT No.: PCT/NZ2017/050175
§ 371 (c)(1),
(2) Date: Jul. 10, 2019

(87) PCT Pub. No.: WO2018/132018
PCT Pub. Date: Jul. 19, 2018

(65) Prior Publication Data
US 2019/0329150 A1 Oct. 31, 2019

(30) Foreign Application Priority Data
Jan. 11, 2017 (NZ) ........................................ 728193

(51) Int. Cl.
*B01D 1/28* (2006.01)
*B01D 1/00* (2006.01)
(Continued)

(52) U.S. Cl.
CPC ............. *B01D 1/28* (2013.01); *B01D 1/0082* (2013.01); *B01D 1/0088* (2013.01); *B01D 1/08* (2013.01);
(Continued)

(58) Field of Classification Search
CPC ...... B01D 1/0082; B01D 1/0088; B01D 1/08; B01D 1/28; B01D 1/305; B01D 5/0012; B01D 5/006; B01D 5/009; C02F 1/041
See application file for complete search history.

(56) References Cited

U.S. PATENT DOCUMENTS 2,696,465 A   12/1954  Kittredge
3,227,630 A *  1/1966  Beckman ................. B01D 1/26
                                                           202/205
(Continued)

FOREIGN PATENT DOCUMENTS

WO      2015/002451 A1    1/2015

OTHER PUBLICATIONS

International Search Report and Written Opinion, dated Dec. 7, 2018, from corresponding PCT application No. PCT/NZ2017/050175.

*Primary Examiner* — Jonathan Miller
(74) *Attorney, Agent, or Firm* — Nixon & Vanderhye

(57) ABSTRACT

In an improved method of distilling fluids, some or all of the fluid is recovered as distillate and the fluid is situated in the shell side of a first shell and tube heat exchanger. The fluid to be recovered as distillate is successively boiled, demisted, compressed and then introduced into upper ends of the tubes. A second shell and tube heat exchanger is located below the first heat exchanger, and distillate from upper ends of the tubes in the second heat exchanger are arranged to receive distillate liquid and/or vapor from the lower ends of tubes of the first heat exchanger. The fluid is located in the shell of the second heat exchanger and that fluid is heated but is not boiled. A mechanism is provided to supply at least some of the heated fluid to the shell of the first heat exchanger.

20 Claims, 10 Drawing Sheets

Figure 1:
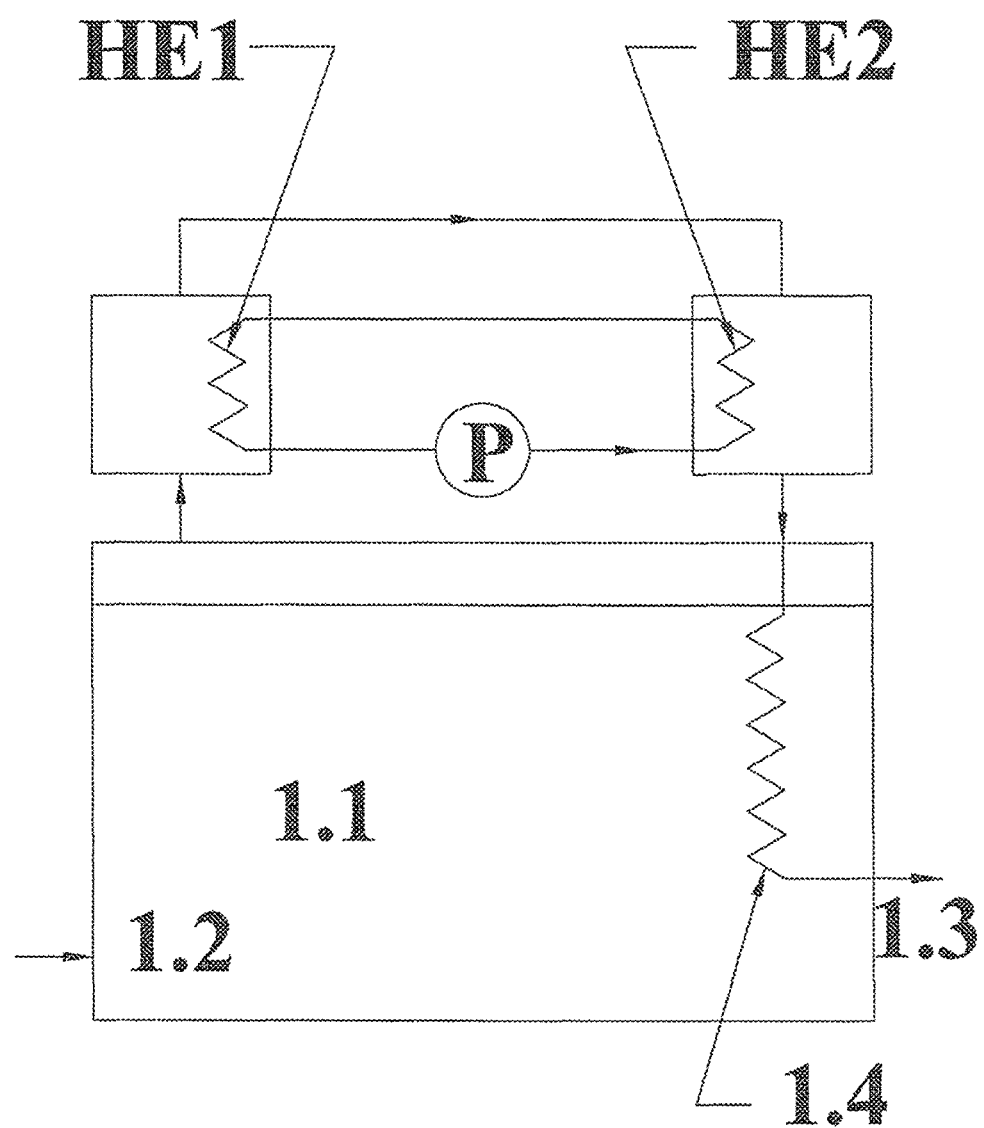

(51) Int. Cl.
  *B01D 1/08*   (2006.01)
  *B01D 1/30*   (2006.01)
  *B01D 5/00*   (2006.01)
  *C02F 1/04*   (2006.01)

(52) U.S. Cl.
  CPC ............. *B01D 1/305* (2013.01); *B01D 5/006* (2013.01); *B01D 5/009* (2013.01); *B01D 5/0012* (2013.01); *C02F 1/041* (2013.01); *C02F 2303/10* (2013.01)

(56) References Cited

U.S. PATENT DOCUMENTS

| | | | |
|---|---|---|---|
| 3,558,438 A * | 1/1971 | Schoenbeck | B01D 1/28 203/26 |
| 3,875,988 A * | 4/1975 | Machida | B01D 1/065 159/13.2 |
| 4,030,985 A * | 6/1977 | Barba | B01D 1/065 202/174 |
| 4,168,211 A | 9/1979 | Pottharst, Jr. | |
| 4,673,459 A * | 6/1987 | Elmore | B01D 1/22 159/13.1 |
| 5,227,027 A | 7/1993 | Topper | |
| 5,435,891 A | 7/1995 | Snitchler | |
| 5,599,429 A | 2/1997 | Martin et al. | |
| 5,630,913 A | 5/1997 | Tajer-Ardebili | |
| 5,645,694 A * | 7/1997 | Stewart | B01D 1/2887 203/22 |
| 5,772,850 A * | 6/1998 | Morris | B01D 1/12 159/24.2 |
| 5,853,549 A * | 12/1998 | Sephton | B01D 1/065 203/2 |
| 7,462,262 B2 * | 12/2008 | Hino | B01D 1/06 159/27.1 |
| 7,597,784 B2 * | 10/2009 | Bednarek | B01D 5/0003 203/1 |
| 8,366,883 B2 * | 2/2013 | Bednarek | F04C 19/002 203/1 |
| 8,771,478 B2 | 7/2014 | Ward | |
| 9,308,467 B2 | 4/2016 | Kamen et al. | |
| 9,770,676 B2 * | 9/2017 | Zebuhr | B01D 1/225 |
| 9,771,278 B2 * | 9/2017 | Haynes | C02F 1/042 |
| 2004/0035533 A1 * | 2/2004 | Isom | B01D 1/0017 159/22 |
| 2010/0200388 A1 | 8/2010 | Ward et al. | |
| 2011/0023485 A1 * | 2/2011 | Schubert | C02F 1/048 60/648 |
| 2013/0220792 A1 | 8/2013 | Ungerer et al. | |
| 2016/0220921 A1 | 8/2016 | Kamen et al. | |

* cited by examiner

METHODS OF DISTILLATION

COPYRIGHT

A portion of the disclosure of this patent document contains material which is subject to copyright protection. The copyright owner has no objection to the facsimile reproduction by anyone of the patent document or the patent disclosure. as it appears in Patent and Trademark Office patent files or records, but otherwise reserves all copyright rights whatsoever.

TECHNICAL FIELD

The invention relates to the field of distillation.

CITATIONS

U.S. Pat. No. 9,308,467 Water Vapor Distillation Apparatus, Method and System. Apr. 12, 2016.

U.S. Pat. No. 8,771,478 Distillation Apparatus. Jul. 8, 2016.

U.S. Pat. No. 5,772,850 Apparatus for Vapor Compression Distillation. Jun. 30, 1998.

U.S. Pat. No. 5,630,913 Water Distillation System. May 20, 1997.

U.S. Pat. No. 5,599,429 Water Distillation System. Feb. 4, 1997.

U.S. Pat. No. 5,435,891 Home Water Distillation Apparatus. Jul. 25, 1995.

U.S. Pat. No. 5,227,027 High Efficiency Water Distillation Apparatus using a Heat Pump System and Process for use thereof. Jul. 13, 1993.

U.S. Pat. No. 4,168,211 Distillation Apparatus and Method. Sep. 18, 1979.

U.S. Pat. No. 2,696,465 Thermocompression Distilling Plant. Jan. 22, 1951.

BACKGROUND TO THE INVENTION

Water of adequate quality is essential for Humans, Animals and crops and is presently in short supply.

Supplies of impure water are generally available and much effort has been devoted to efforts to purify these to an appropriate standard.

The two main methods used for such purification are reverse osmosis and distillation.

Reverse osmosis requires a relatively low amount of energy but produces a very large waste stream, typically 70%, and the membranes used are expensive and have a very short life. Distillation requires a large amount of energy, even when this is done using a vapor compression cycle. Both types of installations are relatively expensive. These issues have meant that these methods have been very limited in the scale on which they can be applied and they have not been able to be applied sufficiently to alleviate the current demand for adequate quality water. It would therefore be useful to have a compact relatively inexpensive device which has a low energy requirement and which has a low maintenance frequency and cost as is described below.

DESCRIPTION OF EMBODIMENTS

The description below is of an improved vapor compression distillation device.

The energy requirement to evaporate water is very large and it is cost prohibitive to do this on a large scale. The fluid must be heated from its intake temperature and boiled or evaporated. Part of that energy may be reclaimed by heat exchange, but the largest proportion of it, the energy of evaporation cannot be reclaimed by straightforward heat exchange as there is no temperature differential to allow that to occur. Hence this energy must come from another source. Heat Pump vapor compression cycles have been used for this purpose to recover energy from the condensing distillate and transfer it into heating the fluid to be distilled as for example in U.S. Pat. Nos. 5,630,913 and 5,227,027. This is illustrated in FIG. 1. Impure fluid enters a heating chamber at 1.1 and distillate exits at 1.3. Heat exchanger HE2 is provided as a heat source for a compressor P which pumps a heat exchange fluid around a loop and discharges heat back into the fluid to be heated via Heat Exchanger HE1.

Figure 2:
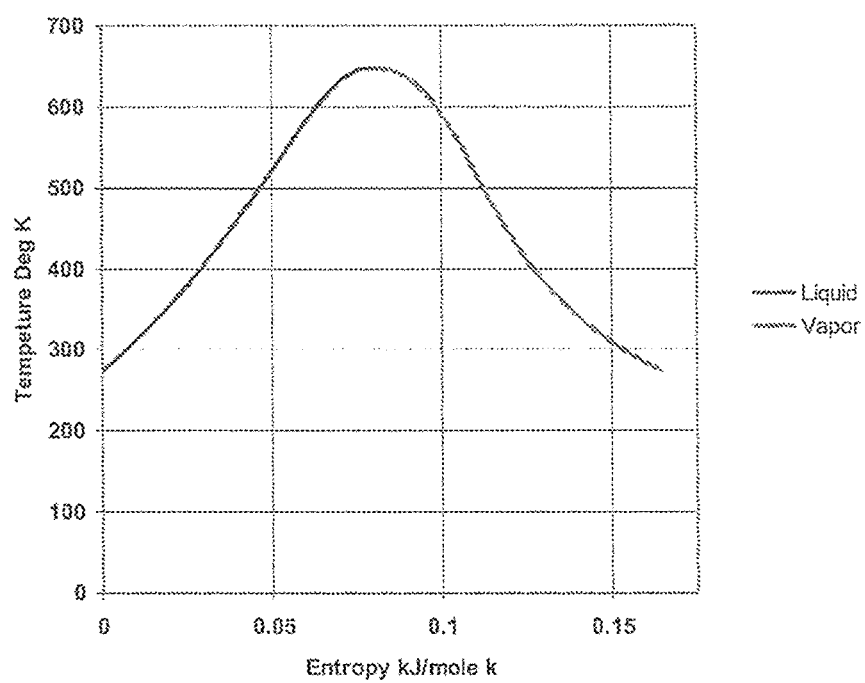
Figure 4:
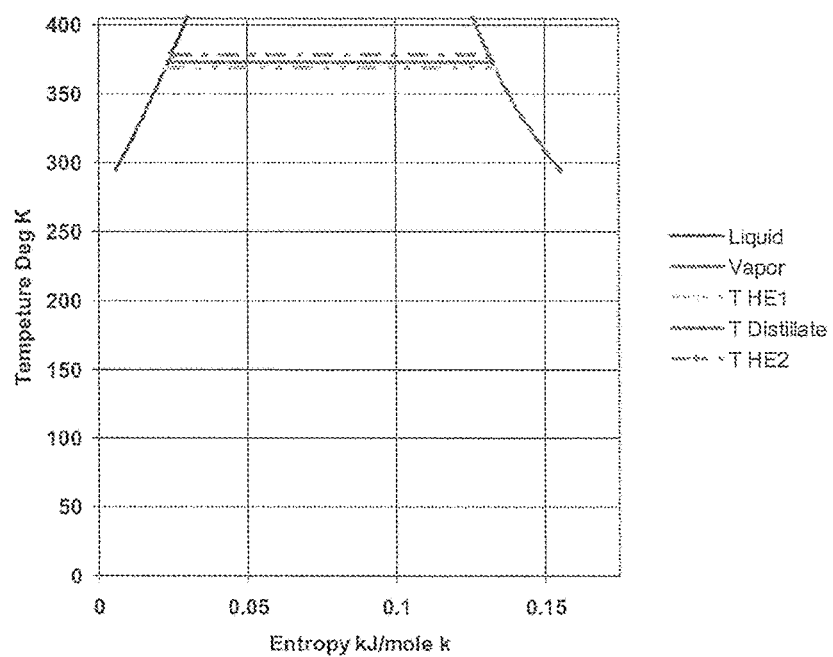

An idealized Temperature entropy diagram for this is shown in FIG. 4 for water operating at the normal boiling point of water. FIG. 2 shows the range of the water Temperature Entropy curves for water up to the critical temperature. The use of a heat pump vapor compression cycle typically results in a lowering of the amount of energy required for evaporation by a factor of 3, the Coefficient of Performance of the heat pump used. As required by the Second Law of Thermodynamics dS dQ/T where dS is the change in entropy of the system, dQ is the amount of heat transferred and T is the Temperature of the system.

Assuming an ideal reversible closed system, the amount of energy transferred is given by the area under the top curve and energy required to transfer a given amount of heat is equal to the sums of the areas inside the curve. The heat energy transferred to the fluid to be heated is given by the area under the top curve and the heat energy recovered from the distillate is given by the area under the bottom curve and the heat energy input required to do this is given by the difference between the two. As can be seen, there are two heat exchangers in this system, both of which have to transfer the amount of energy required to evaporate the distillate or more. Both of these heat exchangers require a temperature difference to transfer this energy, shown as $T_{Distillate} - T_{He1}$ and $T_{He2} - T_{Distillate}$, respectively, assuming no losses in transfer between the two heat exchangers. For most commercial heat exchangers these temperature differences are typically in the range 5 to 7.5 degrees C. Lowering the temperature differences requires more heat exchange area and the actual temperature difference settled on is a matter of balancing capital cost against efficiency. This temperature difference produces an inefficiency in the process as it requires a greater amount of energy input to transfer a given amount of heat to the fluid.

Figure 3:
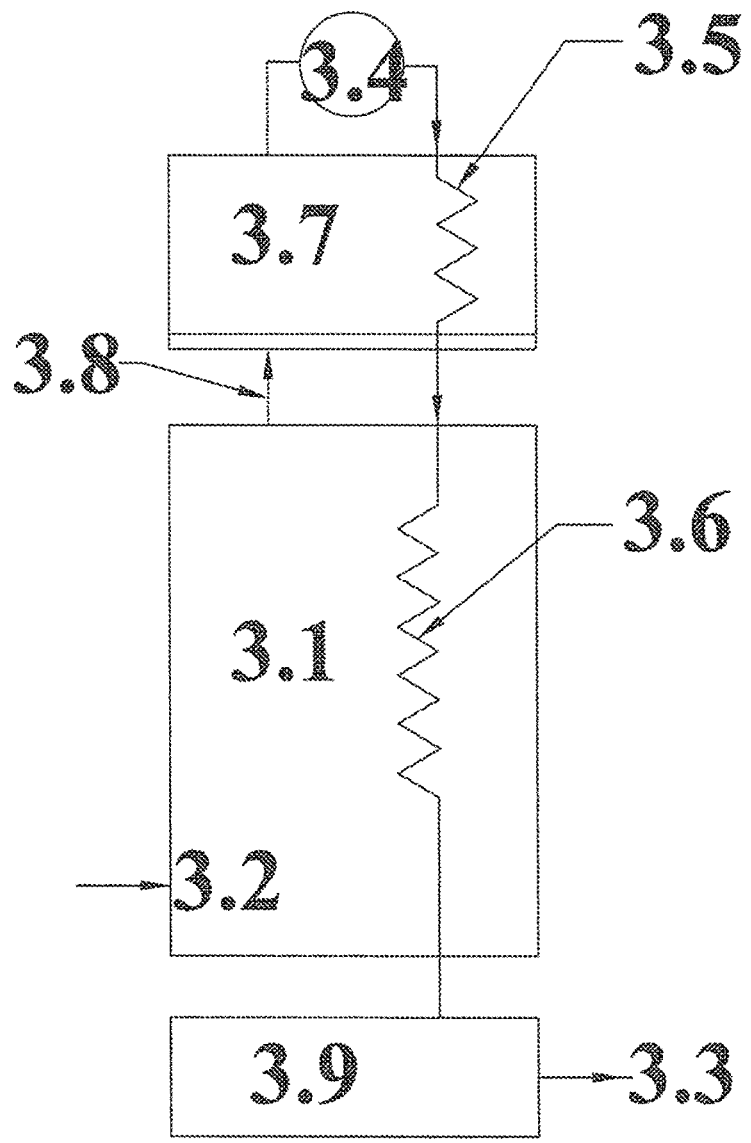
Figure 4A:
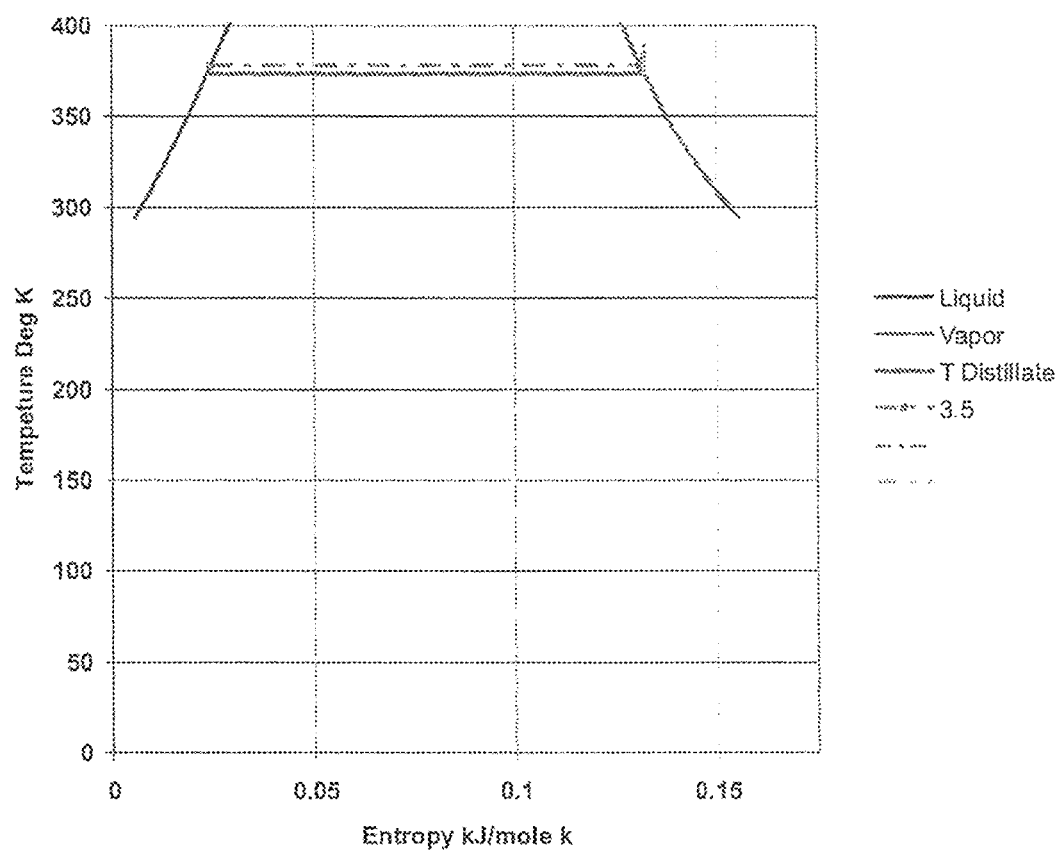

It is advantageous to reduce these temperature differences. One way this can be done is by using the fluid to be heated itself as the working fluid in the heat pump, that is, the heat pump becomes a fluid vapor pump. This eliminates one heat exchanger, the inefficiency, the cost and temperature difference associated with it as shown in FIGS. 3 and 4A. Examples of this are given in U.S. Pat. Nos. 9,308,467, 8,771,478 and 2,696,465.

Figure 4B:
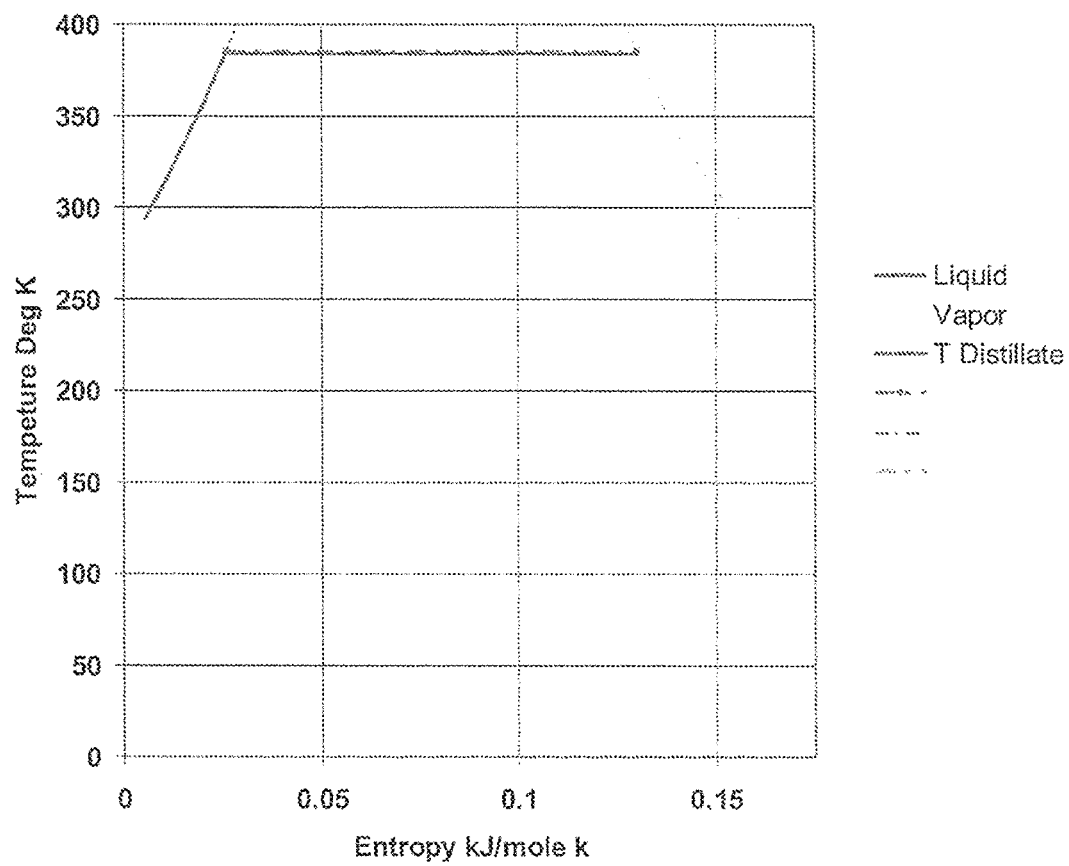

Referring to FIG. 4A, efficiency may be improved by two means: First by raising the Boiling Temperature and second by reducing the temperature difference between the distillate and vapor. The result is shown in FIG. 4B.

In regard to the first method, due to the fact that the TS diagram reaches a peak at the critical temperature, as the working temperature of the vapor cycle increases the area enclosed by the cycle curves decreases and the energy input required from the vapor cycle decreases. Also while the area of the cycle curve decreases, the overall energy under the boiling and compression curve increases, and the proportion of the input energy required from the vapor cycle relative to the said overall energy is lower meaning that Coefficient of Performance is increased. It is notable that in none of the patents cited is there any mention or analysis of the fundamental efficiencies or energy balances based on their thermodynamic cycles. In the embodiment described herein much attention has been given to this and to the various heat transfer mechanisms so as to maximize the heat transfer while producing a low cost low footprint device.

How far the temperature can be increased is a function of the materials employed.

In general materials that will operate in higher temperature and pressures are more costly.

The materials must not contaminate the fluid and must not be corroded by the fluid.

In regard to the second means, this involves the use of greater surface areas for heat transfer and improvements to the heat transfer coefficients. The use of greater surface areas requires more material and adds to the cost; this makes the cost of the materials used a critical factor.

Using water as an example, if the energy requirement for conventional distillation (as for example in U.S. Pat. No. 5,435,891) is taken as 100, then the energy required by a conventional heat pump system (as for example in U.S. Pat. No. 5,227,027) is 33 and the energy required by the embodiment described is 0.269. Thus there is a "gain factor" of 372 for the embodiment described relative to conventional boiling and a gain factor of 124 relative to conventional heat pump systems.

In relation to the thermal energy balance of the system, the energy content of the output fluids (including the small amount of waste) is only very slightly above that of the input fluid (the energy rates differ by less than a hundred watts in FIG. 4B), as the temperature of the distillate stream is close to that of the input fluid. Energy is input to the system by the vapor pump, and it is essentially this amount of energy, less than 1 kW in the embodiment described, that must be dissipated from the system to maintain thermal equilibrium. This is very easily achieved by selectively wrapping the vertical outer case of the device with thermal insulation.

Distillation systems with typical heat exchange temperature differences require significantly more input energy than is required by systems similar to that in FIG. 4B and this produces an excess of energy over that contained in the energy difference between the input fluid and the output fluid. It is usual for such systems to have to take this excess energy out of the system using additional heat exchange means in order to provide an energy balance.

Reducing the temperature differences and input energy as described provides another significant advantage in that it is then possible to provide sufficient energy loss from the outer case and/or cases of the system to the environment so that it becomes no longer necessary to provide an additional heat exchanger and its associated pumps and fans to remove the excess energy input by the vapor pump.

For the highest efficiency the system should be operated at the highest allowable temperature. To ensure this while allowing for operation under different ambient temperatures, a cooling fan 7.28 may be provided to assist in heat removal. It is preferable to design the system insulation so that energy balance is achieved when the fan is operating at its maximum and the ambient temperature is at the highest allowable limits and the system is boiling at its designed allowable maximum temperature. Then, by controlling the fan it is possible to reduce the heat transfer when the ambient temperature is below the maximum allowable so that energy balance is still achieved while operating at or close to the designed maximum allowable temperature. By this means it is possible to maintain high distillation temperatures and maximize the output of distillate under a range of ambient conditions. For example, when distilling water, the output of a unit declines by 27.6% if the distillation temperature drops from 110 C to 100 C. This illustrates the importance of holding the distillation temperature at its maximum allowable value regardless of ambient conditions. It will be appreciated that if partial vacuum distillation of water of TDS below 2000 ppm is carried out (as for example in U.S. Pat. No. 8,771,478), the output of such a unit is greatly reduced.

It is an object of this invention to provide a system that is efficient but is of low cost.

In practice, when the fluid to be distilled is water, these requirements rule out the use of metals for containment and heat transfer.

Plastics offer a possible solution. The present relative costs of some of the lower cost plastics in US cents/pound are:

| Polypropylene | HDPE | UHMWPE | PVC |
| --- | --- | --- | --- |
| 75 | 88 | 150 | 75 |

But converting these to cost per unit volume the relative costs are

| 71 | 84 | 143 | 109 |
| --- | --- | --- | --- |

By comparison, stainless steel is approximately 131 cents per pound and has a relative cost per unit volume of 1080, a factor of 15 times that of Polypropylene.

Of these plastics Polypropylene has the highest service temperature and so, on a cost basis, this is a useful choice. It is also possible to obtain Polypropylene in higher heat resistant grades such as homopolymer grades. In addition heat resistance may be added by use of stabilizers. Fillers such as talc in particular give not only higher heat resistance but can also result in up to 40% higher thermal conductivity which is very useful. It is possible to operate such Polypropylene in the region of 114 C on a continuous basis. It should be noted that with water as the fluid, this means that the saturation pressure of pure water is 1.506 atmospheres or 22.13 psia.

Considering the heat transfer required, there are several different regimes: Referring to FIG. 3, a region 3.1 is shown, heated by heat exchanger 3.6, where the fluid is heated from the intake temperature to close to the boiling temperature, and a region 3.7 where all boiling takes place is shown, heated by heat exchanger 3.5. While it is desirable to completely separate the heat exchangers into one dealing with boiling and one not, in practice it is necessary to allow for a small amount of non-boiling heating to occur in heat exchanger 3.5 so as to ensure that no boiling ever takes place in heat exchanger 3.6.

In the embodiments described, both 3.5 and 3.6 are shell and tube exchangers with the length of the tubes oriented within 15% of the vertical and with interiors of the tubes being the hotter sides of the exchangers.

If overall optimization of heat transfer in the distiller is to occur, then because of the different heat transfer regimes in the boiling/condensation area and the heating regions it is necessary to optimize these regions separately, and that is one reason for physically separating the heat exchanger into heating and predominantly boiling types.

In heat exchanger 3.6, liquid fluid on the higher pressure higher temperature side from the vapor pump 3.4 is in contact with the wall of the heat exchanger. It is well known that the heat transfer through a heat exchanger is the inverse of the sum of the inverses of the heat transfer coefficients of the vapor and/or liquid to the heat exchanger wall, the coefficient of the conduction through the material of the heat exchanger, and the coefficient of the transfer from the heat exchanger wall to the surrounding fluid.

Figure 5:
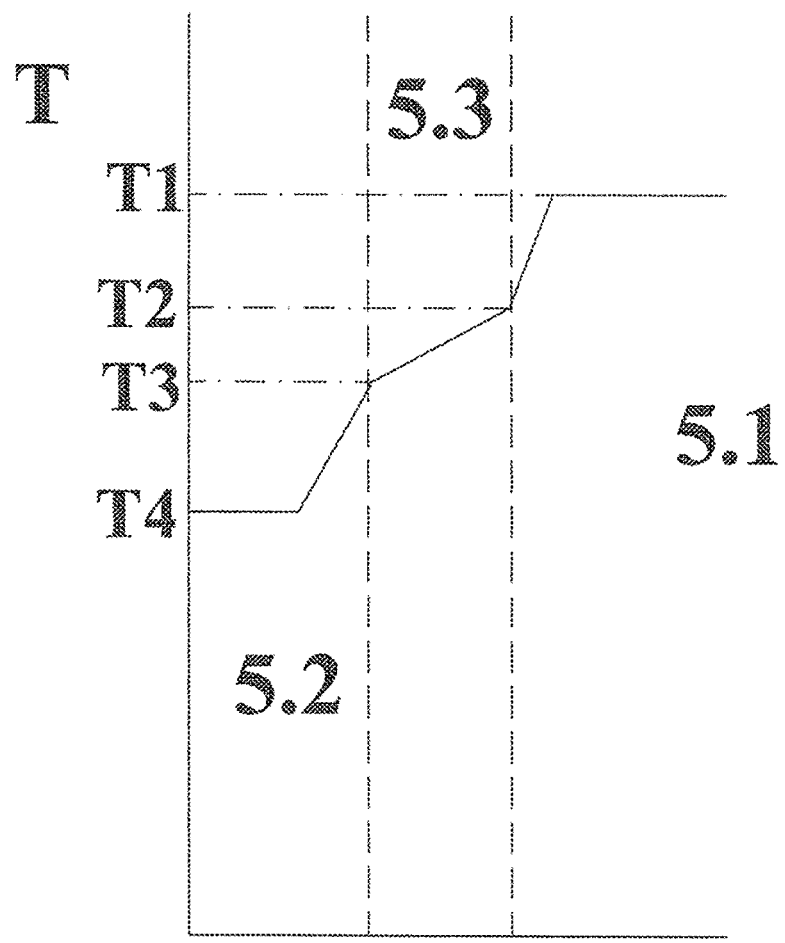

FIG. 5 shows the temperature profile across the heat exchanger. There is a temperature difference T1-T2 between the fluid 5.1 and the wall of the heat exchanger which is governed by the film coefficient of heat transfer and the quantity of heat transferred. This heat then flows through the wall of the heat exchanger 5.3. There is a temperature differential across the said wall T2-T3 which is a function of the conductivity of that part of the heat exchanger. The heat then flows from the wall of the heat exchanger into the fluid 5.2, and there is a temperature difference T3-T4 there which is governed by the film coefficient of heat transfer of that region.

The increase of conductivity of the heat exchanger wall by the use of additives in the plastic has been mentioned above although in this case conduction is not the principle factor limiting heat flow. The film coefficients of heat transfer may be increased by using roughened surfaces on the heat transfer areas. This is easily accommodated in extrusion processes.

Increasing the surface area of the heat exchanger 3.6 lowers all the temperature differences mentioned above. In this case it means maximizing the surface area of heat transfer inside a given size fluid container. In practice this means choosing a large number of small diameter tubes rather than a smaller number of larger diameter tubes. It will be appreciated that the use of close packed tubes gives rise to a far higher surface area for heat transfer than is the case with plate type heat exchangers. There are practical limits on how closely tubes may be packed. Where the tubes are to be supported by injection molded plates for instance there is a limit to how thin it is possible to make the web thickness between the tubes. This also varies with the flow characteristics of the chosen material and how closely the molding is gated. In the case of Polypropylene, the minimum acceptable web thickness is approximately 1 mm. The alternative to injection molded plates is the use of pressed plates, but since the web thickness achievable by pressing is greater than that achievable by molding, injection molded plates are used in this embodiment.

Mathematical analysis leads to an optimum outside size of 2 times the sum of web thickness plus any clearance allowed for inserting the tubes. However, it is not desirable to make the tubes so small that surface tension effects due to condensed fluid cause problems with draining of condensed fluid from the heat exchanger. The surface tension effects are a function of the surface energy of the tube material, the fluid being distilled, and the temperature.

The surface energy for some plastics in dynes/cm are:

| | |
|---|---|
| PTFE | 19 |
| Polypropylene | 30 |
| Polyethylene | 30 |
| PVC | 39 |

The surface energy of water varies with temperature from 75.6 at 0° C. to 58.8 at 100 C.

Experiments with water at various temperatures with various size tube internal diameters show that PVC requires a larger tube ID than Polyethylene or Polypropylene.

Even at low temperatures no draining problems occur for Polyethylene and Polypropylene tubes with inside diameters down to 2.5 mm. Smaller tube sizes than this were shown to give rise to blockage and improper drainage. It is desirable to ensure that the insides of the tubes in heat exchanger 3.6 are as fully covered as possible with the heat transfer fluid. Fluid is required to drain freely out of the tubes in heat exchanger 3.5 so that there is as little as possible coverage of the tube wall by the fluid. This occurs naturally when tube internal dimensions are in the range 2.5 to 6 mm. If necessary to augment the coverage of the tubes in heat exchanger 3.6, it is possible to restrict the exits of the tubes either directly or with an outlet plate with holes that communicate with the tubes in heat exchanger 3.6 but where the holes are of slightly smaller size than the tubes. The outlet plate may be arranged to transit across the faces of the ends of the hexagonal tubes so that the flow through the tubes is varied. The said flow may be controlled so that the hexagonal tubes in heat exchanger 3.6 are substantially full of liquid fluid but so that there is still a vapor gap between the top of the hexagonal tubes in heat exchanger 3.6 and the start of the hexagonal tubes in heat exchanger 3.5. By this means it is possible to maintain heat exchanger 3.6 at least substantially full of liquid fluid so as to maximize the heat transfer in 3.6 and to allow free drainage of liquid fluid from heat exchanger 3.5 thereby maximizing heat transfer in that heat exchanger.

The distillate discharge from heat exchanger 3.6 is preferably discharged into a collection vessel 3.9. There are also material cost factors to consider in that it is desirable to maximize the surface area for a given amount of material. Considering hexagonal shaped tubes in a close packed array, each side of the hexagon is as short as it can possibly be if a large area is to be filled with the fewest number of hexagons. This means that a hexagonal matrix requires less material to construct than other shapes; hence the choice of hexagon shaped tubes in this embodiment. Hexagonal profiles are also readily extruded or drawn. These are nominal profiles as some rounding at the corners usually occurs. It is of course desirable to minimize the wall thickness of any such profile for both heat transfer and material cost reasons but there are practical limits placed on this by the extrusion and drawing processes leading to minimum wall thicknesses 0.5 mm and above. In addition as outlined below, it is desirable for the ratio of the surface area outside the tubes to the plan area encompassed by the tubes to be as high as possible. This ratio varies from 0.42 at the mathematically optimum tube size to about 0.39 for this embodiment, very close to the optimum.

The close packing of the hexagons contributes to the responsiveness of the system as it significantly lowers the quantity of fluid stored in the system.

The combination of these effects in the case of water leads to the use of a close packed array of thin walled hexagonal tubes with a rough surface in the across flat size range 4 mm to 10 mm.

While the limits of the various parameters may be known, it is necessary to make some allowances for variation, and it is unwise to manufacture right at the allowable limits. In this embodiment a set of parameter values was chosen to ensure that practical manufacturing limits were applied while still having very close to the optimum performance.

For the heat exchanger 3.6 this embodiment uses nominal 4.4958 mm across flat hexagonal Polypropylene tubes with a nominal wall thickness of 0.5604 mm at a nominal center spacing of 5.7658 mm.

Since all the necessary parameters of the this area are now known, heat transfer in this area may be approximated by the equation in Leinhard: Heat Transfer Handbook FIG. 8.3, equation 8.27 page 378 plus the Corrective Value from Leinhard FIG. 8.7 page 385 L/R=2.3/0.2=10 and Pr=0.7=2>2 times $$Nu=0.68+0.67Ra^{0.25}/(1+0.492Pr^{9/16})^{4/9}$$

Pr no is approx 1. Pr=u Cp/k where:

Pr is the Prandtl number, Nu is the Nusselt number, Ra is the Rayleigh number, u is the dynamic viscosity, Cp is the specific heat at constant pressure, k is the thermal conductivity, L is the tube length and R is the nominal tube radius. It should be noted that the flow both inside and outside the tubes is very slow with approximate Reynolds numbers of 28.

It is possible to augment the heat exchange in this area by causing vibration or oscillation of the tubes. Some vibration may be transferred from the heat exchanger 3.5 as noted below, but it is also possible to cause the tubes to vibrate by applying external stimuli.

The fundamental frequency at which the tubes vibrate is given by twice the length of the tubes divided by the speed of sound in the region. In the embodiment described this gives rise to a fundamental frequency of 1052 Hz. Application of this frequency or an integral multiple of this frequency to the case of heat exchanger causes the tubes to oscillate, thereby increasing the fluid velocity around the tubes and increasing the heat transfer rate. This also assists in ensuring that the close packed tubes cannot remain in wall to wall contact as the water in between the tubes is in motion. It is not necessary for the applied frequency to be exactly the calculated value: frequencies within +−20% of this value still cause substantial oscillation. Application of such an external stimulus is shown in 7.26.

In heat exchanger 3.5 boiling and condensation takes place, and this is a much more complex heat transfer situation. Again in general FIG. 5 may be used to describe the heat transfer through this exchanger also. The same size hexagonal tubes are used here but the spacing is different. Conduction through the tubes has already been maximized as described above. There is a large difference in the film coefficients of condensation, as much as 10:1, depending on whether the condensation is drop-wise or film-wise. It is notable that the prior art normally uses the less efficient film-wise condensation as in earlier years the importance of drop-wise condensation was not well recognized. In addition, in most prior art metals were used as the heat transfer surfaces and it has proven to be difficult if not impossible to achieve lasting drop-wise condensation on metals due to their higher surface energies. Plastics such as Polypropylene were not commercially available prior to 1957, and high temperature resistant grades were not available until recently. Drop-wise condensation occurs when the condensate does not spread out and cover and hence mask the heat transfer surface. Thus it is very important that drop-wise condensation occurs and that the droplets produced readily run off the heat transfer surface. Surface tension effects are very important here and it has been found that Polyolefins do not allow spreading of the condensate and are thus ideally suited to causing drop-wise condensation when used with water at the temperatures and pressures encountered. This is not true for PVC, metals or other materials with surface energies greater than approximately 31 dynes/cm. Use of such materials would substantially reduce the film heat transfer coefficients. It is important that the heat transfer surfaces in this region are vertically oriented. If a configuration which is horizontal or close to horizontal is employed as in U.S. Pat. No. 8,771,478, the surface which collects the drops is partially or even completely obscured by liquid fluid thus giving rise to film condensation in that region with a consequent substantial lowering of the heat transfer coefficient and the overall heat transfer.

Various studies of drop-wise condensation have been made and coefficients of heat transfer have been established which allow for calculation.

On the evaporative side convective assisted boiling as opposed to pool boiling occurs.

The fluid flashes to vapor, expanding greatly and causing substantial turbulence. This turbulence significantly increases the heat transfer coefficients. When thin wall plastic tubes are used the turbulence also gives rise to vibration in the tubes and this greatly assists in preventing the adherence of any material to the tubes. If the tubes have thicker walls or are of stiffer material such as metal this advantage does not occur. When the heat exchangers 3.5 and 3.6 and collection vessel 3.9 are coupled together as described below, this vibration is transferred through to the tribes in the lower heat exchanger thus increasing the heat flow in that heat exchanger.

Kandikar et al have studied this heat transfer situation and have established equations for calculating the heat transfer coefficients. These equations show a dependence on the quality of the vapor, and the heat transfer coefficients increase up to a vapor quality of about 0.7 but decrease at higher vapor qualities. Thus it is important to provide the appropriate spacing between the tubes so as to accommodate a vapor quality of close to 0.7, and thus the spacing between the hexagonal tubes has to be greater in this region than it is in the heating region. If the tube spacing is made too small, the vapor quality increases, heat transfer reduces and boil out may occur. This also increases the risk of liquid fluid surges causing pass through of liquid to the pump. If, however, the spacing is made too great, vapor quality decreases and heat transfer suffers. Thus there is an optimum spacing between the tubes. It has been found that a close packed spacing of 6.6548 mm is close to the optimum. This is greater than the 5.7658 mm spacing used in heat exchanger 3.6 and, although this may not seem a large difference, it does result in a difference in the ratios of surface area per unit height of approximately 1.63. This is partly due to the increase in tube spacing but also partly due to the provision of reflux tubes in 3.5 as described below. An alternative to the provision of reflux tubes is described in U.S. Pat. No. 5,772,850. There, the fluid to be boiled is on the tube side of the heat exchanger, that is, inside the tubes, rather than outside the tubes as in this embodiment. This gives rise to violent ejection of fluid from the tubes by the vapor formed during the evaporation. It is possible to mitigate this by using tubes of larger diameter and U.S. Pat. No. 5,772,850 proposes tubes of 1.5" minimum internal diameter. It will be appreciated that this greatly reduces the available heat transfer surface area relative to the method described in this embodiment and thus it is not desirable to have the fluid to be distilled on the tube side of the heat exchanger.

Thus it can be seen that it is important to separately optimize the heat transfers of heat exchangers 3.5 and 3.6 in order to optimize the overall performance of the distiller.

Since the two heat exchangers have differing tube spacing and are situated with heat exchanger 3.5 above 3.6, it is necessary to provide a short length of casing which allows for connection of the two groups of hexagonal tubes.

It is necessary to control the fluid level in heat exchanger 3.5. This is difficult to do within the heat exchanger due to the severe fluctuations in level caused by boiling. It is possible to connect a tube to act as a manometer between regions near the top and bottom of heat exchanger 3.5. Since there is no vapor flow in the manometer tube, it has a relatively stable liquid level. The level is controlled at a nominal height of (1—the average vapor quality) of the height in heat exchanger 3.5 where the fluid is boiling. For example, when the vapor quality is 0.7 and the height where boiling commences is 50 mm above the base of heat exchanger 3.5 which itself has a tube length of H, then the fluid level is nominally maintained at 50+0.7*(H−50) mm above the base of the heat exchanger. It is possible to measure the heights of fluid in a manometer by several means, for example, by visual or magnetic detection means of a float, by ultrasonic means etc. It has been found that it is possible to measure the capacitance of the liquid within the manometer and to obtain a direct measurement of fluid height by that means without having any parts of the measuring apparatus in contact with the fluid and without using any moving parts. Such a method is immune to corrosion effects by the fluid and is very reliable. This method has been chosen in this embodiment wherever fluid level must be measured.

The vapor pump 7.14 draws off the vapor. However as the vapor rises in heat exchanger 3.5, it entrains a large amount of liquid and it is necessary to recycle this liquid for boiling and prevent it from entering the pump. This problem is discussed in U.S. Pat. No. 4,168,211 which proposes a method differing from that described in this embodiment for dealing with it.

In this embodiment the liquid is recycled by the provision of a number of tubes running from the top to the bottom of the heat exchanger. These tubes, which are designated reflux tubes, have a plurality of holes near their top and bottom ends to allow them to collect liquid from the top region of the heat exchanger and return the liquid to the bottom region of the heat exchanger. Vapor for the pump intake is drawn off by a riser which is fitted with a demister obeying Souders-Brown design criteria to prevent liquid from entering the pump intake. It is important that the said demister is very efficient so as to prevent carry over of liquid fluid in the form of mist droplets. Carry over of mist droplets causes contamination of the distillate both with dissolved solids and possible biological contamination. U.S. Pat. Nos. 9,308,467 and 8,771,478 contain no such demister or reflux arrangements and as such are prone to such contamination. In the embodiment below the efficiency of this demister is in excess of 99.9999%.

Figure 7:
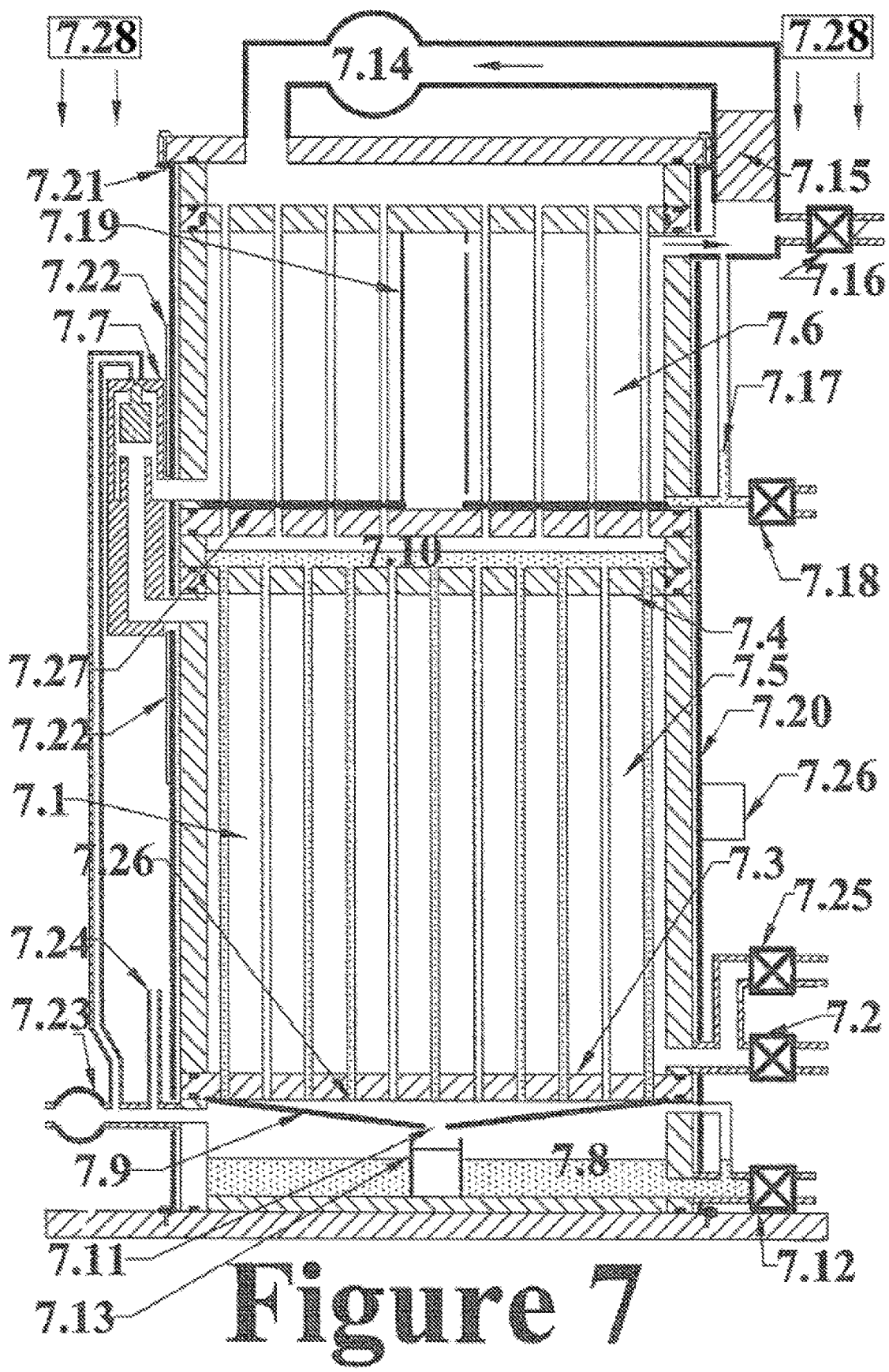

Heat exchangers 3.5 and 3.6 and collection vessel 3.9 are coupled together. It is advantageous to mount these heat exchangers one above the other with the collection vessel below heat exchanger 3.6. It is useful if the plan outlines of the heat exchangers and the collection vessel and indeed all the outlines of all the exterior casing parts that are shown as collinear in FIG. 7 are the same as this allows the use of efficient and simple coupling methods to be used to assemble the embodiment. The use of extruded profiles for the outer case of both heat exchangers is preferred as this allows for using the same section throughout the embodiment with length differences only for the various casing parts thus generating economies of scale. These parts may be heat welded together, but the preferred embodiment uses O ring seals for this purpose as this method offers a lower cost and more rapid assembly method. Due to the temperatures and pressures the casings are subjected to and the stresses involved, it is not economically sound to use a square profile as the required wall thicknesses and therefore cost must increase substantially to compensate for the stresses. A square profile with substantially rounded corners is possible and this gives rises to a maximum amount of heat transfer area for given plan dimensions, but this would call for a very expensive bespoke die for larger sizes. Since the heat exchangers will be under pressure, to minimize the thickness of the containment methods it is desirable that the heat exchangers are cylindrical in shape. Polypropylene is already extruded in round sections and for this reason the embodiment shown uses a round section.

Fluids to be distilled often contain unwanted dissolved gases and liquids as well as solids and it is desirable to remove these from the distillate. For example, ground water sometimes contains hydrocarbons and these should be removed from the distillate and perhaps collected. In some applications it may be desirable to degas the water. For example, in fracking operations where there is dissolved methane in the water, it is desirable to remove it, and in certain well water situations the well water may contain fluids of lower boiling point than water such as, for example, carbon tetra chloride which it is desirable to remove.

By separating the heat exchangers 3.5 and 3.6 into a heating only region and a region where all the boiling takes place, it is possible to remove such undesirable items from the distillate. In this embodiment this is done by ensuring that heat exchanger 3.5 transfers very slightly more heat than is necessary to boil the fluid. This ensures that while no boiling takes place in heat exchanger 3.6, the temperature at exit from the exchanger is very close to boiling temperature of fluid with the level of TDS contained in 3.6 at the pressure that exists at the exit from heat exchanger 3.6. Under those conditions, liquids of boiling points lower than that of the distillate and much of the dissolved gases are present as vapors.

Figure 6:
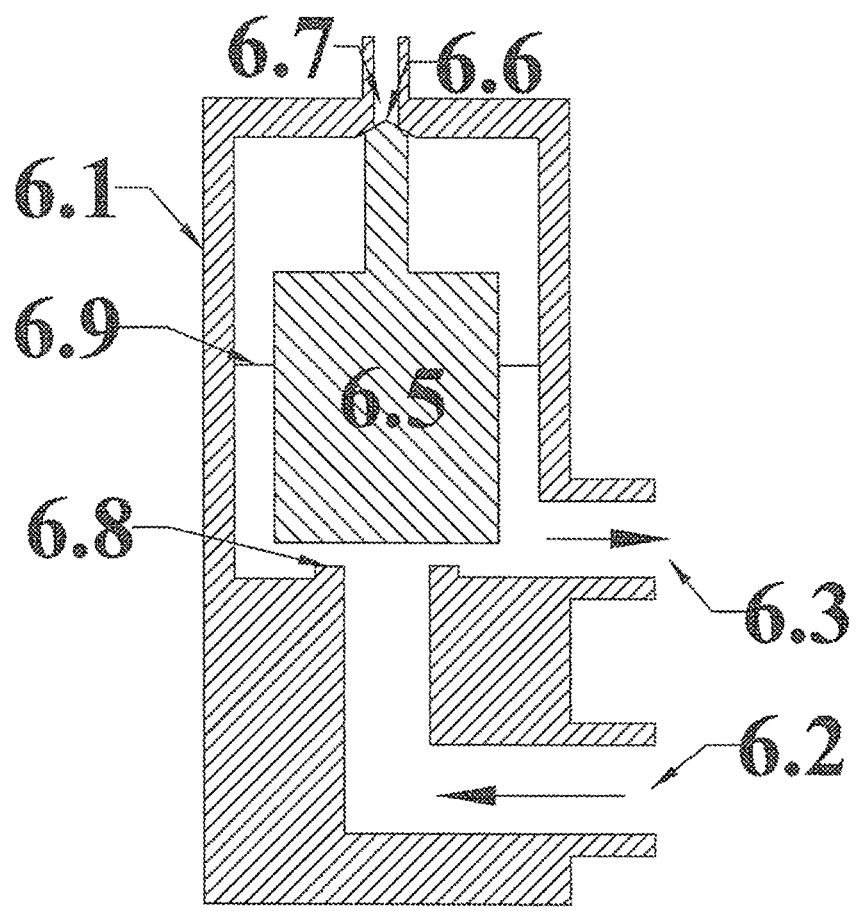

In this embodiment at least one of the devices 3.8 connecting the heat exchanger 3.5 and 3.6 is used to remove these vapors and prevent them entering heat exchanger 3.5. Fluids of higher boiling points than the distillate are not evaporated by heat exchanger 3.5 and are discharged as described below. Thus there are substantial advantages in separating the heat exchangers 3.5 and 3.6. FIG. 6 shows a diagrammatic section through a vapor trap device situated between the heat exchangers 3.5 and 3.6 suitable for separating the unwanted vapors. The device has a chambered body 6.1, an inlet to said chamber 6.2 for taking fluid from heat exchanger 3.6, and an outlet from said chamber for delivering fluid to heat exchanger 3.5 as shown by the arrows indicating the direction of fluid flow. A float 6.5 is within the chamber and is coupled to a valve 6.6 within an outlet 6.7. The device is arranged so that the pressure in outlet 6.7 is no greater than the pressure in inlet 6.2. An approximate equilibrium fluid level line 6.9 is shown such that if the fluid level sinks below this line, the float 6.5 sinks, thus opening outlet 6.7. The inlet 6.2 terminates at a location 6.8 such that during the designed flow from heat exchanger 3.6 to 3.5 through the device, any vapor present in the inlet flow does not exit via the outlet 6.3 but rather accumulates in the chamber causing the float to sink and vapor to flow out of the outlet 6.7 with the volume of said vapor being made up by flow from the inlet 6.2 and/or the outlet 6.3. By this means the unwanted vapor is removed from the fluid before it is evaporated and thus the distillate is free from this material. If the unwanted vapor has sufficient value, it may be collected separately. It is also possible to collect any sensible heat from the unwanted vapors by passing them through a heat exchanger to heat the incoming fluid as in U.S. Pat. No. 5,599,429, but economics of this are at best marginal.

It is possible to arrange for multiple heat exchangers similar to 3.6 to be connected in series using vapor removal traps as described above. By this means vapors of differing boiling points may be progressively drawn off and recovered or discarded as required thus forming a distillation column. Heat exchanger 3.6 has to be sized to heat the intake fluid from its intake temperature to its boiling temperature or very close to that temperature. In practice, for water and many other fluids, this usually means being able to heat the fluid from the average temperature of shallow ground water. That temperature varies in the US from 10 C to 25 C. While any intake temperature may be chosen for this purpose, in the embodiment shown that temperature is taken as 15 C. The temperature of the distillate asymptotes to the value of the intake temperature. Thus, in the situation where ground water is the intake fluid, the distillate is advantageously quite cool.

If the intake temperature happens to be greater than 15 C, then temperature difference across heat exchanger 3.6 is reduced and it is not operating to its maximum capacity. If the temperature falls below 15 C then the heat exchanger 3.6 is operating at its designed point and the residual amount of water heating required is carried out in heat exchanger 3.5.

The distillation device may be sized to suit any nominated output rate of distillate. In the embodiment shown the output rate is chosen to be between 1 and 2 US gpm for water.

In this embodiment the height of the distillation device is chosen to be the maximum that will fit inside the height of a high cube shipping container with some clearance allowed for insertion into the container. This allows for maximizing the heat exchanger length and capacity. A suitable size of pipe for this duty is nominal 450 mm diameter SDR Polypropylene pipe. When larger quantities of water are required, it is necessary to operate many units in parallel. In order to conveniently transport such systems it is useful to fit these into shipping containers and a 450 mm diameter allows 5 such units to be placed across the width of a shipping container with little waste space. The area that would otherwise be unused because the unit is circular in cross section rather than square is available for and is occupied by certain ancillary equipment described below. Up to 12 rows of such units can be placed in the length of a 20 ft shipping container, a total of 60 units. This applies whether a rectangular matrix or a close packed array of units is used. The rectangular array is the preferred embodiment as this allows for better access for interconnecting plumbing and services. The overall weight of the units is close to, but within the allowed weight of the contents of such a container. When a number of units are used in parallel in this manner, the arrangements for measurement of flow rates, liquid levels, drainage and controls may be done centrally rather than on each individual unit, thus providing a significant cost reduction.

The distillation unit is operated at as high a temperature as possible for efficiency reasons, typically at 110 degrees C. The allowable stress for polypropylene under those conditions is relatively low and this would lead to large wall thicknesses. In order to avoid this, an outer case of sheet steel is fitted around the unit and is tensioned circumferentially after the fashion of a hose clamp and also longitudinally so that the circumferential and longitudinal stresses caused by any positive internal pressure may be taken by the steel and so that the polypropylene is used as a constrained gasket and therefore may be of minimal thickness. The steel and any insulation applied serves as a barrier to ultra violet light and this means that the polypropylene need not have UV protection additives. This is important as when the unit is used for potable water, the materials in contact with the water must be NSF rated and many UV additives are not so rated.

When water containing dissolved solid is boiled, the boiling point increases with the concentration of the dissolved solids at a given pressure. In this device, as distillate is removed the TDS concentration increases in the water being evaporated. At a 30% dissolved solid concentration the boiling point is raised by approximately 10 degrees C. The polypropylene temperature must not be allowed to exceed a certain maximum. A method of preventing temperature rise is to control the pressure within the distiller so that temperature of distillation is held to a nominal maximum value. This means that the pressure is progressively reduced as the TDS increase. In practice, allowing the pressure to fall to atmospheric level allows the TDS to rise to above 30% while holding the maximum vapor temperature below 114 degrees C. Thus by these means the IDS in heat exchanger 3.5 can be increased to 30%. It must be noted that there is no such increase in TDS in heat exchanger 3.6 as no boiling is allowed to occur there. It is possible to increase the TDS in heat exchanger 3.5 further by applying a level of vacuum to the distiller. For example, a reduction of pressure of 5 psi below standard atmosphere results in a boiling point that approximately doubles the TDS and halves the waste stream. In the embodiment described, a combined pressure and vacuum pump connected to collection vessel 3.9 is used to control the pressure inside the distiller such that the boiling temperature is maintained at a desired value and such that the distillate output rate is controlled and preferably maximized at any given boiling temperature.

To ensure that the pressures to be measured are not disturbed by variation in the fluid levels in heat exchanger 3.5 and in the collection tank, it has been found advantageous to control those levels closely. In the embodiment described this is done by using PID (proportional, integral, derivative) controllers for maintaining the two liquid levels. If off-on controllers or P or PI controllers were to be used, the fluid levels would fluctuate and this would result in pressure variations which were unrelated to the boiling temperature of the fluid. Since the pressure is used to control the boiling temperature and the rate of boiling, this would lead to instability in the control. The pressure is controlled so that a predetermined rate of boiling takes place and this rate may be arranged to be maximized. Maximizing this rate maximizes the output of distilled fluid from the device which is clearly advantageous. The rate of boiling may be determined from the rate of input of water to the unit either from a dedicated flow measurement device and/or from the values set on the PID control which controls the input water and/or the draw off from the collection tank either from a dedicated flow measurement device and/or from the values set on the PID control which controls the liquid level in the collection vessel, or a boiling sensor may be used to determine this rate. The boiling sensor may be an acoustic device which may be arranged with filters to reduce and/or eliminate extraneous sounds and where the amplitude of the sound is a function of the rate of boiling of fluid at a given boiling pressure and temperature. A control is also used for regulating the pressure on the basis of the rate of boiling of fluid as determined by one or more of the above methods. This control may be a damped positive feedback system such that time integrated values of the rates of distillate production are fed back and used to regulate the pressure so that the rate of distillate production is controlled and may be optimized for any given boiling temperature. Another control method may be to use minimization or maximization algorithms, preferably of an heuristic nature, to control and optimize the rate of distillate production. An example of this is the use of a Nelder-Mead minimization technique. It should be noted that maximization can be achieved by using minimization algorithms, for example, to the negated value of the function to be maximized. The temperature of the boiling is set by the resultant pressure and this is arranged so that a stable operating regime results. It will be appreciated that as the boiling pressure reduces with a particular fluid, so does the rate of distillate output from the unit when a fixed volumetric rate vapor pump is used. It is possible to arrange for a variable volumetric rate on the vapor pump, but this also means that the pump must be increased in size to accommodate the maximum boiling rate required at the lowest applied pressure.

The outlet of the vapor trap 6.7 is coupled to a location between the connection of the said pump to the distiller. The method of control described has the advantage that, unlike normal atmospheric boiling, the distiller operation is unaffected by altitude.

When the TDS in heat exchanger 3.5 is such that the applied pressure is insufficiently low to allow for an adequate rate of boiling of fluid, this indicates that the TDS has risen such that it is necessary to discharge some of the water from the exchanger and replace it with intake water. This is designated as purging. This may be done on a periodic or a continuous basis. Purging on a periodic basis is preferred as it does not require the use of a vacuum on the purging outlet and the average TDS in the boiling chamber is lower and, thus, is less prone to cause build up on the heat exchanger tubes. When purging is done on a periodic basis, it is best to drain the heat exchanger 3.5, purge with a predetermined amount of intake water, then allow the fluid level to regain its previous level. If the unit is at a pressure below local atmospheric pressure it may be necessary to use a vacuum break to ensure an orderly flow of fluid during this process.

Thus, even limiting the pressure to standard atmospheric value, it is possible to concentrate water to at least 30% TDS and since most groundwater is below 2000 ppm TDS, a maximum waste stream of 0.67% results. This is much less than the usual 70% waste stream from reverse osmosis systems. Seawater can have up to 40,000 ppm TDS and distilling this give rise to a 13% waste stream. When the distilling pressure is reduced below atmospheric pressure it is possible to reduce the waste stream from distilling seawater to below 5%. If desired, it is possible to recover sensible energy stored in the waste stream by passing the waste stream through a heat exchanger to heat the inlet fluid; however, due to the low waste stream percentages and the relatively small amount of energy that can be recycled by such methodology, the economics of so doing are problematic.

It will be appreciated that if purging were to be controlled on the basis of direct measurement of TDS, a TDS measurement element in contact with the fluid to be boiled is required. This is not desirable due to the corrosiveness of the fluid and the limited longevity of such measurement devices. It will be appreciated that the TDS of the fluid being boiled can be measured by the pressure required for boiling at a given temperature and, since that parameter is being measured and controlled, it is unnecessary to use any direct contact TDS devices.

Purging may also be initiated on the basis of the pressure inside the heat exchanger and the temperature near the top of heat exchanger 3.6 thus ensuring that no boiling takes place in heat exchanger 3.6.

Since there is no boiling and are no heat transfer hot spots within heat exchanger 3.6 and since the heat exchanger tubes are subject to some vibration, there is little or no deposition of solids. Unlike pipes made from other materials, it is known that polypropylene pipe is suitable for indefinite use without cleaning under these conditions. This is because the low surface energy of the polypropylene inhibits deposition.

In heat exchanger 3.5 there is substantial concentration of TDS during extended operation and deposition of solids may occur, and, as a result the boiling temperature of the fluid in 3.5 may increase at a particular pressure of operation. Although these solids do not tend to adhere to the polypropylene, it is useful to be able to remove them periodically by means of periodic discharge. This may be augmented by providing a sheet metal scraper around the hexagonal tubes in the exchanger and by providing means for moving the scraper along the length of the tubes, preferably during a periodic discharge. If so desired, a scraper may also be fitted to heat exchanger 3.6.

Figure 8:
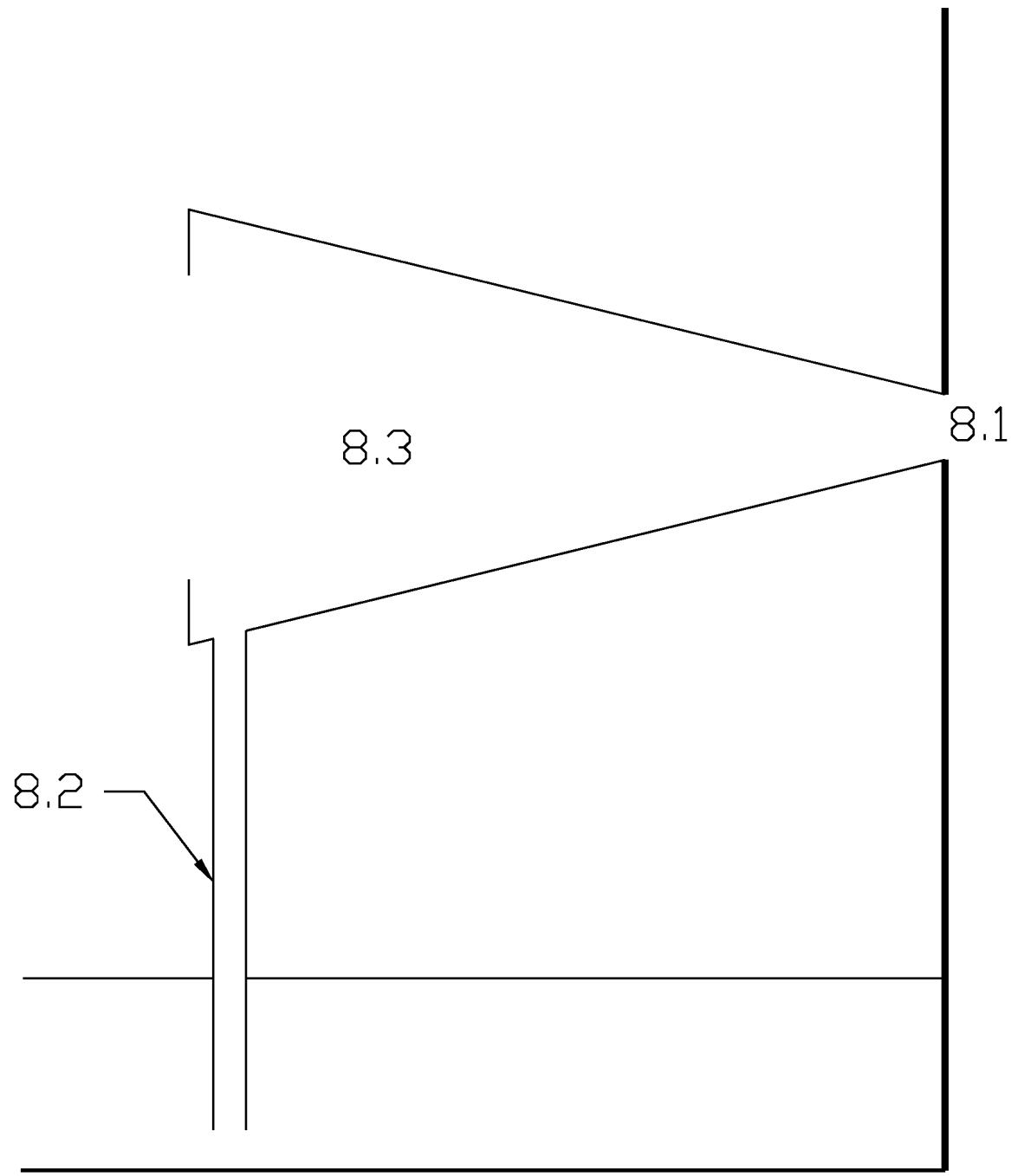

FIGS. 7 and 8 show the results of applying these precepts in the embodiment. The temperature difference across the boiling heat exchanger has been reduced to 1.18 degrees C. and the non-boiling heat exchanger has a similar temperature difference. The result is a very large reduction in the energy requirement. It should be noted that under these conditions, the pump requires to operate at a maximum temperature of 114.2 degrees C., a pressure of 1.506 atm (22.13 psi) and a pressure differential of 0.052 atm or 0.76 psi and, under those conditions, it must be capable of passing the correct amount of vapor required. These parameters severely limit the types of pumps that may be used. The pressure differential is too high for axial fans. Turbines can operate at those pressure differentials but they are expensive. Centrifugal fans to do this duty are physically large in diameter and because of their load lines, it is difficult to arrange for them to provide the correct amount of vapor throughput under all conditions. Screw pumps and piston pumps can handle this duty, but they do not have great longevity and are costly. Vane pumps are relatively low cost but have poor longevity. Roots blowers and Rotary Claw Pumps offer preferred solutions as they have great longevity due to the lack of sliding contact and low cost. Rotary Claw Pumps have a further advantage in that they are very efficient positive displacement machines and as such can readily be controlled to provide the correct amounts of vapor draw off under all conditions. For these reasons rotary claw pumps have been used in the embodiment described.

The advantages of operating at the highest practically allowable temperature in relation to energy were mentioned above. There is a further advantage, however, in that the specific volume also decreases with temperature rise and therefore the physical size of the pump is reduced.

There is a further advantage in relation to disease-causing organisms in the water to be distilled. The CDC recommends that water be boiled for one minute to kill most types of disease-causing organisms (at standard atmospheric pressure). This device holds the water at 110 C for an extended period of time and the peak temperature reached is 114 C. This more than meets the CDC recommendations. In fact, autoclave steam sterilizing is usually carried out at 121 C, only slightly above the temperature achieved in this embodiment. In addition, the demister which prevents the passage of any mist droplets that might contain disease-causing organisms is in excess of 99.999% efficient meaning that carryover of such organisms is almost nonexistent.

Distilled water drains from the bottom of the heat exchanger 3.6 into collection vessel 3.9. The water is sub cooled at this location but, while liquid water is largely composed of drips, there may also be some accompanying water mist. Water mist may also be generated by the action of the drips falling into the water in the collection vessel. Since the collection vessel is operated at a controlled pressure and/or vacuum and since the saturation temperature of the collected distillate is well below that pressure, there is in effect a quasi static situation where there is effectively no flow of gases into or out of the collection vessel. Hence there is no effective tendency to draw off vapor or mist from the collection vessel. The only issue that arises then is whether or not entrainment of air into the collected water is desirable. If the distilled water is to be used as potable water, it is desirable to include dissolved gases such as oxygen and carbon dioxide for taste purposes whereas for other uses the presence of dissolved gases is undesirable.

When the pressure of the collection vessel is below atmospheric pressure, it is possible that said mist may be passed through into the device controlling the pressure in the distiller thereby slightly reducing the distillate output.

To collect this mist it may be desirable to use a demister. Two methods of achieving this are described which may be used separately or together.

FIG. 7 is a diagrammatic preferred embodiment of a water distillation device incorporating the devices and precepts outlined above.

The first and preferred method shown in FIG. 7 uses a shallow cone 7.9 placed below the outlet of the heat exchanger to collect all the water. The cone has a hole 7.11 near the center of the cone, sized such that above a certain minimum flow rate of water, a continuous flow of water rather than drips passes through the hole. It is also sized so that it introduces only a minimal head loss under maximum flow conditions. In the instance described, a hole diameter of approximately 17 mm has been found to be suitable to accommodate water flows from 0.125 US gpm and upwards to beyond the limit of the capacity of this device without allowing the passage of any water mist. Mist that is present above the cone is entrained into the water flow. An optional drainage pipe 7.13 at least partially filled with open mesh or sponge material may be placed below the cone hole to minimize splashing and to pass the water collected by the cone to below the surface of the water in the collection vessel 7.8. In this embodiment the inside diameter of the drain pipe is greater than 17 mm. If the distilled water is to be used as potable water it is desirable to include dissolved gases such as oxygen and carbon dioxide for taste purposes and in that case such an optional drain pipe would not be used and entrainment of gases present in collection vessel 7.8 is encouraged. In this circumstance it may be desirable to allow the water drips to fall directly into the collection vessel so as to entrain the maximum amount of air into the water. Since the solubility of gases in water increases as the temperature is lowered and this is the location where the distillate is at its lowest temperature, it is appropriate to dissolve these gases in this location.

With both this method and the second method described below it is useful to drain any demisted water into the collection vessel 7.8.

The second method is a traditional demister obeying Souders-Brown design criteria. See FIG. 8. These demisters are suitable for a range of fluid vapor velocities typically ranging from 25% to 125% of the design value. The distinguishing feature in this instance is that the mist is the entire vapor, not just a fraction of the total, and, as it passes through the demister, it is progressively deposited out and the total mass flow rate declines. Since the collection efficiency may be designed to be in excess of 99.999%, the mass flow rate declines by the same value. It has been found to be advantageous to use a demister tapered in a pyramidal fashion to keep the velocity of the fluid within the design velocity range of the device and hence keep the collection efficiency high. This also causes deposited fluid to drain away from the outlet 8.1. The unit is packed with demister material 8.3. It has also been found to be advantageous to arrange for drainage from the unit to below the surface of water in a collection vessel by one or more tubes 8.2. The pressure control arrangements are connected to the outlet 8.1.

In some circumstances it may be necessary to remove dissolved gases from the distillate. In those cases the means described above is used to limit entrainment of gases and the distillate is passed through a sparger. Sparging the distillate rather than sparging the incoming fluid to the distiller results in a lower dissolved gas content and requires a lower capacity sparger.

It is advantageous from a manufacturing standpoint to have the outside shells of all the vessels contiguous as shown, but other arrangements are possible. Draw off from collection vessel 7.8 is arranged by controlling an outlet valve, preferably of the modulating type and/or a pump 7.12 so that the water level in the collection vessel 7.8 is maintained at a fixed nominal level as described above. Most of the components are made from Polypropylene. The heat exchanger 7.5 (3.6 above) is made up of 4698 close packed 4.4958 mm across flat thin wall hexagonal tubes which preferably have roughened surfaces. The tubes are passed through two support plates 7.3 and 7.4. The tubes are sealed to the support plates which in turn have sealing means to the shell of said heat exchanger 7.5 to prevent leakage. Plate 7.3 provides the bottom end of a body of water 7.1 to be heated. A water inlet to allow for adding water to replace that which is distilled is placed near plate 7.3. This ensures that the heat exchanger has a counter flow characteristic. Water is supplied to 7.1 via valve 7.2 which preferably is of a modulating type arranged so as to maintain a fixed water level 7.17 for supply of water to be distilled to heat exchanger 7.6. The water or fluid supplied should be free from particulates.

The tubes are also sealed to the support plate 7.4, and there are sealing means to ensure that the support plate 7.3 is sealed to the inside wall of the container. The close packed array of tubes means that the quantity of water surrounding the tubes is only about 30% of that which would occur in the absence of the tubes. Thus the unit is more responsive to changes and comes on line faster than would otherwise be possible. This also minimizes the quantity and mass of water needed to operate the unit. Plate 7.4 is disposed vertically in the heat exchanger 7.5 such that the fluid inside the exchanger is heated to just slightly below the boiling point. Fluid from the shell of heat exchanger 7.5 discharges into vapor trap 7.7 which removes vapors that may be present, and the fluid is then discharged into heat exchanger 7.6.

Heat exchanger 7.6 is configured so that all the boiling takes place in the shell of said exchanger. By this means, concentration of any dissolved solids takes place only in shell of heat exchanger 7.6 and it is only that region which need be drained or harvested to remove dissolved solids rather than the entire body of water. Heat exchanger 7.6 has 2918 hexagonal tubes of the same dimensions as used in heat exchanger 7.5 but at somewhat larger spacing, thus allowing for the presence of vapor in the optimum amount. 7.6 is also fitted with 19 reflux tubes 7.19 to collect liquid from near the top of the shell of 7.6 and return it to near the bottom of the shell. An optional scraper plate 7.27 may be arranged in either or both heat exchangers so that vertical movement of said plate scrapes any build up of material from the outside of the hexagonal tubes. It is possible to add more plates similar to 7.4 and vapor traps at various heights in the shell of heat exchanger 7.5 so that fractional distillation of dissolved gases and lower boiling point fluids may be carried out. This takes advantage of the temperature gradient within the body of fluid. The tops of the tube sides of heat exchanger 7.5 are connected to space 7.10 which in turn is connected to the bottoms of the tube sides of heat exchanger 7.6 thus allowing the passage of distillate and vapor between the two heat exchangers. It is desirable to maintain a level of water as shown in 7.10, and this level may be maintained by providing a restriction at the ends of the tubes in heat exchanger 7.5 as shown in 7.26 and/or by providing a manually or automatically moveably adjustable plate with holes at this location. This method provides a more consistent and accurate method of controlling the flow than attempting to size the inside tube dimensions and also ensures that the same tube size can be used for both 7.5 and 7.6 thus giving manufacturing economies of scale. A pump 7.14, preferably of the rotary claw type, draws vapor off the shell side of heat exchanger 7.6 via a demister 7.15 and passes the vapor to the tube sides of heat exchanger 7.6. Water is returned from near the top of the shell of heat exchanger 7.6 to near the bottom of said heat exchanger by one or more reflux tubes 7.19. Heat exchanger 7.6 is equipped with end plates providing a similar function to those in heat exchanger 7.5. A scraper plate 7.27 which may be moved up and down to remove deposits from the tubes is provided. A similar plate may optionally be provided in heat exchanger 7.5. A valve 7.18 is provided to allow for either periodic or modulated purging of heat exchanger 7.6. Placement of the valve in this location discharges fluid from 7.6 without any flow back into 7.5 and thus prevents any concentrations of dissolved solids from flowing back into 7.5 thereby ensuring that it is not necessary to drain 7.5 during purging operations. This valve may also be used to dump fluid from 7.6 in the event of freezing temperatures. An optional valve 7.16 is provided to allow air into the distiller when necessary to prevent any damage due to over stressing.

An outer case 7.20, split in the manner of a hose clamp and tensioned circumferentially and also longitudinally by bolts 7.21, is arranged to support the outer shells of the vessels so as to limit and/or eliminate tension stresses in said shells. Heater bands 7.22 are clamped to the outside of said case and the whole assembly is provided with insulation (not shown) such that the overall heat loss over time from the distiller is limited to the heat input by the pump 7.14.

Controllable cooling fans 7.28 for assisting with providing the energy balance as described earlier are shown.

A means of controlling the boiling temperature in the distiller is provided. This may be done by measuring the boiling temperature and modulating the pressure in the distiller. One means of achieving this is shown. A vacuum pump 7.23 with a modulation valve is connected to vessel 7.8. A source of pressure is provided via a restricted pipe 7.24 such that the modulation of the vacuum pump is capable of maintaining pressures above or below atmospheric pressure in vessel 7.8 as required to maintain the required boiling temperature. The modulation of the vacuum pump may also be arranged so as to maximize and/or control the distillate production rate. It should be noted that the outlet from vapor tray 7.7 is disposed so that it is between the restricted pipe 7.24 and the vacuum pump/modulation valve so as to ensure that vapors from 7.7 are discharged to atmosphere.

These units are intended for use either outdoors or indoors. Especially in outdoor cases, it is necessary to heat or preferably drain the unit in order to prevent freeze damage. This is preferably done by monitoring the temperatures in the unit and operating drain valves such as 7.12, 7.18 and 7.25 in the event of these temperatures falling too low, and as a fail-safe they are also arranged so as to drain the unit in the event of power failure. When draining, it is necessary to provide for ingress of air when the pressure in the system falls below the local atmospheric pressure so as to ensure draining takes place without causing any over stressing of the distille, and valve 7.16 may be used for this purpose. In the event it is physically difficult to drain all the water from the collection vessel, this vessel may be provided with an insert to act as a false bottom, raising the bottom so that it is close to level with the pipe leading to the output valve 7.12. By this means near complete drainage may be carried out.

Where the unit is subjected to freezing, one or more drain valves to prevent freeze damage should be used so as not to be reliant on the availability of power for heating.

To start the unit from cold, band heating elements 7.22 located on the outside of the sheet metal case adjacent to the lower part of heat exchanger 7.6 and the upper part of heat exchanger 7.5 heat the water in those heat exchangers. A partial vacuum is applied to the collection vessel. When the water temperature in the exchangers reaches approximately 60 C, there is sufficient vacuum in the system for boiling to commence and vapor commences to flow through the vapor pump. This accelerates the rate of heating and vapor recovery and eventually the designed fluid temperature and pressure is reached. When that occurs, the band heating elements are turned off. Since the amount of fluid stored in the heat exchangers is quite small due to the large numbers of heat exchange tubes, the system heats rapidly and the starting process only lasts a few minutes.

In summary, this outlines a low-cost compact durable method of very economical distillation of water. The best performance on a unit with similar output that has been previously possible is using a vapor cycle or heat exchanger recovery to reduce this to approximately 55 kW. This system is capable of doing the same job using only approximately 1 kW.

A comparison with reverse osmosis systems may also be made. These do not necessarily use more input power but they require frequent costly replacement of the membrane elements whereas there is very little maintenance on this unit.

Perhaps more importantly, reverse osmosis units have a large waste stream of approximately 70% of the total flow.

These units have a much lower waste stream of typically less than 1%.

It is also possible to run the concentrate stream from several units into a second unit designed to operate at higher temperatures thereby concentrating it further to any level required and thereby further reducing the waste stream to insignificant levels. The limit is only reached when the dissolved solids precipitate out, and even then the precipitate may be removed by flushing.

Since the power requirements of these units are very low, it is possible to simply supply this from photovoltaic solar systems with some battery backup. Consequently, it is possible to put these units in remote locations where there is no power grid.

It will be appreciated that since these units are made from low cost plastic materials and have very few ancillary parts, they are of low cost and high reliability.

The example, given is for water distillation. Many other uses for distilling other fluids are possible, for example in distillation and fractional distillation installations in refineries and food processing plants. The system may be used at a wide range of pressures and temperatures and with a wide variety of fluids.

The invention claimed is:

1. A fluid distillation device wherein some or all of a fluid is recovered as distillate and where at least some of the fluid is situated in a shell side of a first shell and tube heat exchanger wherein at least some of the tubes are oriented within fifteen degrees of vertical, wherein the fluid to be distilled is introduced to the shell side near the lower end of said tubes at a temperature within 20° C. of the boiling point of said fluid, and wherein at least part of the fluid in the shell side of the heat exchanger to be recovered as distillate is successively boiled, at least partially demisted, compressed and then introduced into upper ends of said tubes.

2. The device as in claim 1 wherein a second shell and tube heat exchanger which also has at least some of the tubes of the second shell and tube heat exchanger oriented within fifteen degrees of vertical is located below the first heat exchanger and wherein distillate from at least some upper ends of the tubes in the second heat exchanger are arranged to receive distillate liquid and/or vapor from at least some of the lower ends of tubes of the first heat exchanger and wherein some of said fluid is located in the shell of the second heat exchanger and wherein that fluid is heated to within 20° C. of the boiling point, but is not boiled, and wherein means are provided to supply at least some of said heated fluid to the shell of the first heat exchanger, and wherein the fluid to be distilled is introduced into the shell near the lower ends of the tubes in the second heat exchanger.

3. The device as in claim 2 wherein at least some fluid supplied by said second heat exchanger to said first heat exchanger does so through at least one device capable of removal of undesirable gases and liquids that have been vaporized by the second heat exchanger from said fluid.

4. The device as in claim 1 wherein at least some of said tubes are substantially hexagonal in shape and have a nominal inside across flat dimension in the range 2.5 mm to 6 mm.

5. The device as in claim 2 wherein at least some of the tubes in the second heat exchanger are substantially hexagonal in shape and in a nominally close packed array and the nominal spacing between the outside flats of at least some of the tubes is in the range 0.7 mm to 3 mm.

6. The device as in claim 1 wherein at least some of the tubes of the first heat exchanger are substantially hexagonal in shape and arranged in a nominally close packed array and wherein the nominal spacing between the outside flats of at least some of the tubes is in the range 3 mm to 10 mm and/or wherein the average vapor quality in the region where boiling takes place is 0.7 plus or minus 30%.

7. The device as in claim 1 wherein the first heat exchanger is fitted with one or more internal reflux pipes to provide a means of returning liquid fluid from near the top of said heat exchanger to near the bottom of said heat exchanger.

8. The device as in claim 2 wherein no additional heat exchanger is required to remove heat from the device.

9. The device as in claim 2 wherein at least one cooling fan is provided to remove heat from the exterior of the system.

10. The device as in claim 9 wherein said cooling fan is controllable to vary said heat removal.

11. The device as in claim 2 wherein a collection vessel is situated below said second heat exchanger and wherein the perimeter of the outer shell of said vessel is substantially the same shape as the perimeter of said heat exchanger and wherein the perimeters are substantially aligned in plan view and wherein said shape may be nominally circular and wherein lower ends of said second heat exchanger tubes drain into said collection vessel through at least one demisting device and/or anti splash and/or anti gas entrainment means.

12. The device as in claim 11 wherein said at least one demisting device comprises at least one demister comprising a shallow cone arranged with an apex downwards and wherein there are one or more holes at and/or adjacent to the apex of said cone to allow drainage of fluid.

13. The device as in claim 2 wherein a sheet metal casing is placed around the periphery of the device and said casing is tensioned circumferentially against the said periphery and is also tensioned longitudinally so as to restrain the top end of heat exchanger 7.6 and the bottom end of said collection vessel.

14. The device as in claim 2 wherein an external vibration device is applied to the outside of said second heat exchanger, oscillating at a frequency that is within 20% of the fundamental frequency of the tubes, or within 20% of an integral multiple of the fundamental frequency of said tubes.

15. The device as in claim 1 wherein one or more of said heat exchangers is fitted with at least one moveable scraper to remove any buildup of material from the outside of the tubes and wherein drainage means are provided from one or more said heat exchangers and wherein means for allowing air to enter the device is provided and wherein an entry point for fluid to said second heat exchanger is provided and wherein said drainage means and air entry means may be activated so as to provide for drainage and/or purging of fluid at prescribed times and/or for prescribed durations and/or frequencies and/or under prescribed conditions and/or when the device is at risk of freezing.

16. The device as in claim 1 wherein the static fluid level in the first heat exchanger is maintained at a nominated level without withdrawing any liquid from the shell of said heat exchanger.

17. The device as in claim 2 wherein there is means for controlling the liquid level inside the tubes of said second heat exchanger.

18. The device as in claim 1 wherein the boiling rate of the fluid in said first heat exchanger is controlled by controlling the pressure within the device and wherein the pressure control means may be a damped positive feedback system or wherein the pressure control means may be a minimization or maximization technique and wherein the boiling rate of the fluid may be optimized and/or may be maximized for any set of conditions within the device.

19. The device as in claim 3, further comprising one or more said second heat exchanger connected via one or more vapor removal devices such that each second heat exchanger raises the temperature of the fluid in the shell so that vapors of differing boiling points may be removed and/or recovered progressively with the last second heat exchanger in the series discharging fluid from the shell at a temperature close to the boiling point of the fluid.

20. The device as in claim 2 wherein at least some distillate draining from the tubes is sparged to remove at least some of any remaining dissolved gases.

* * * * *